United States Patent
Cionca et al.

(10) Patent No.: US 10,592,513 B1
(45) Date of Patent: Mar. 17, 2020

(54) MULTIPLE SOCIAL STREAMS

(71) Applicant: GOOGLE LLC, Mountain View, CA (US)

(72) Inventors: Lucian Florin Cionca, Santa Clara, CA (US); Junbin Teng, Cupertino, CA (US); Andre Rohe, Mountain View, CA (US); Harish Chandran, Sunnyvale, CA (US); Yumio Saneyoshi, Belmont, CA (US)

(73) Assignee: GOOGLE LLC, Mountain View, CA (US)

( * ) Notice: Subject to any disclaimer, the term of this patent is extended or adjusted under 35 U.S.C. 154(b) by 1058 days.

(21) Appl. No.: 14/599,407

(22) Filed: Jan. 16, 2015

Related U.S. Application Data (60) Provisional application No. 61/928,385, filed on Jan. 16, 2014.

(51) Int. Cl.
   *G06F 16/20* (2019.01)
   *G06F 16/2457* (2019.01)

(52) U.S. Cl.
   CPC .............................. *G06F 16/24578* (2019.01)

(58) Field of Classification Search
   None
   See application file for complete search history.

(56) References Cited

U.S. PATENT DOCUMENTS

| | | | | |
|---|---|---|---|---|
| 8,943,526 B2 * | 1/2015 | Rivera | ............. | H04N 21/44213 |
| | | | | 705/14.41 |
| 9,361,005 B2 * | 6/2016 | Wheatley | .............. | G06F 3/0484 |
| 9,380,013 B1 * | 6/2016 | Cashmore | ................ | H04L 51/10 |
| 9,553,939 B2 * | 1/2017 | Yu | ............................ | H04L 67/22 |
| 9,703,837 B1 * | 7/2017 | Teng | .................... | G06F 17/3053 |
| 2009/0063984 A1 * | 3/2009 | Agarwal | ................ | G06Q 30/02 |
| | | | | 715/733 |
| 2011/0225170 A1 * | 9/2011 | Obasanjo | .......... | G06F 17/30864 |
| | | | | 707/748 |
| 2011/0302153 A1 * | 12/2011 | Meretakis | ......... | G06F 17/30864 |
| | | | | 707/722 |
| 2012/0110080 A1 * | 5/2012 | Panyam | ................ | G06Q 50/01 |
| | | | | 709/204 |
| 2013/0073631 A1 * | 3/2013 | Patton | .................... | G06Q 10/10 |
| | | | | 709/204 |

(Continued)

OTHER PUBLICATIONS

Agrawal, "Facebook Algorithm Now Surfaces Old News & Interesting Insights," Aug. 2013, retrieved from http://www.shoutmeloud.com/facebook-news-bumping-algorithm-important-marketing.html.

*Primary Examiner* — Belix M Ortiz Ditren
(74) *Attorney, Agent, or Firm* — Lowenstein Sandler LLP (57) ABSTRACT

In one aspect, a method includes identifying a first user viewing a first set of posts at a social networking service, the first set of posts including one or more posts, determining that the level of engagement of the first user at the social networking service is below a predetermined level, generating a second set of posts in response to determining that the level of engagement of the first user at the social networking service is below a predetermined level, the second set of posts including one or more posts not previously seen by the user and providing the second set of posts for display to the user. Other aspects can be embodied in corresponding systems and apparatus, including computer program products.

17 Claims, 6 Drawing Sheets

(56) References Cited

U.S. PATENT DOCUMENTS

2013/0304727 A1* 11/2013 Poon .................. G06F 17/30477
707/722
2017/0126825 A1* 5/2017 Yu ........................... H04L 67/22
2017/0264935 A1* 9/2017 Pizzurro ................ G06Q 30/02

* cited by examiner

MULTIPLE SOCIAL STREAMS

CROSS-REFERENCE TO RELATED APPLICATION

The present application claims the benefit of U.S. Provisional Patent Application Ser. No. 61/928,385, entitled "Multiple Social Streams," filed on Jan. 16, 2014, which is hereby incorporated by reference in its entirety for all purposes.

BACKGROUND

Social networking services provide a collection of content items ("posts") for display to users. The posts may include content posted by one or more other users that may be of interest to a user, and may be provided to the user to encourage user engagement at the social networking service. Typically, there is a direct correlation between the number and/or quality of posts provided to the user and the amount of time the user spends at the social networking service.

SUMMARY

The disclosed subject matter relates to a machine-implemented method including identifying a first user viewing a first set of posts at a social networking service, the first set of posts including one or more posts. The method may further include determining that the level of engagement of the first user at the social networking service is below a predetermined level. The method may further include generating a second set of posts in response to determining that the level of engagement of the first user at the social networking service is below a predetermined level, the second set of posts including one or more posts not previously seen by the user. The method may further include providing the second set of posts for display to the user. Other aspects can be embodied in corresponding systems and apparatus, including computer program products. These and other aspects can include one or more of the following features.

The method may further include identifying a plurality of posts, the plurality of posts including posts available for being provided for display to the first user. The method may further include selecting the one or more posts of the first set of posts from the plurality of posts according to a first selection criteria. The method may further include providing the first set of posts for display to the first user.

The selecting the one or more posts of the first set may include determining that a quality indication of the first set of posts meets a first quality threshold. The first set of post may include one or more posts of a plurality of posts available for display to the first user that meet a first selection criteria. The one or more posts of the second set of posts may be selected from the other posts of the plurality of posts that do not meet the first selection criteria. The one or more posts of the second set of posts may meet a second selection criteria. The first selection criteria may be different from the second selection criteria. The first selection criteria may include a first quality threshold and the second selection criteria may include a second quality threshold and the second quality threshold may be lower than the first quality threshold.

Generating the second set of posts may include identifying a plurality of posts not previously seen by the user and selecting the one or more posts of the second set of posts from the plurality of posts. Selecting the second set of posts may include determining a quality score for each of the one or more posts of the second posts and determining that the quality score of each of the one or more posts meeting a quality criteria. The quality score for each post may be determined according to one or more of a popularity score, an affinity score and a freshness score associated with the post.

A post may be determined to be not previously seen by the user if it was not previously provided for display to the first user. A post may be determined to be not previously seen by the user if the post was previously provided for display to the first user but the post was not determined to be seen by the user. Determining if a post is previously seen by the user may be based on one or more indications of user activity with respect to the post provided for display to the user. The one or more indications may include whether the post was brought into a viewport, whether the post remained in the viewport for a specific period of time, the position of the post within the viewport, position of a cursor with respect to the post or user activity with respect to the post.

Determining that the level of engagement of the first user is below a predetermined level may include determining the level of engagement of the first user with respect to the first set of posts based on one or more engagement criteria and determining that the determined level of engagement of the first user is below the predetermined level. The engagement criteria may include historical activity of the user with respect to posts displayed to the user. The engagement criteria may include one or more explicit actions by the user that indicate user interest to see more posts, the one or more explicit actions including refreshing the page, scrolling or explicitly requesting additional posts.

The disclosed subject matter also relates to a system including one or more processors and a machine-readable medium comprising instructions stored therein, which when executed by the processors, cause the processors to perform operations including identifying a first user viewing a first set of posts at a social networking service, the first set of posts including one or more posts selected from a plurality of posts and meeting a first quality threshold. The operations may further include determining that the level of engagement of the first user with respect to the first set of posts is below a predetermined level. The operations may further include generating a second set of posts, the second set of posts including one or more posts of the plurality of posts not previously seen by the user. The operations may further include providing the second set of posts for display to the user in response to determining that the level of engagement of the first user with respect to the first set of posts is below a predetermined level. Other aspects can be embodied in corresponding systems and apparatus, including computer program products.

The disclosed subject matter also relates to a machine-readable medium including instructions stored therein, which when executed by a machine, cause the machine to perform operations including identifying a plurality of posts, the plurality of posts including posts available for being provided for display to the first user at a social networking service. The operations may further include generating a first set of posts, the first set of posts including one or more posts of the plurality of posts meeting a first quality threshold. The operations may further include determining that the level of engagement of the first user with respect to the first set of posts is below a predetermined level. The operations may further include generating a second set of posts, the second set of posts including one or more posts of the plurality of posts not previously seen by the user and meeting a second quality threshold. The operations may further include providing the second set of posts for display to the user in response to determining that the level of engagement of the first user with respect to the first set of posts is below a predetermined level. Other aspects can be embodied in corresponding systems and apparatus, including computer program products.

These and other features described throughout the application provide one or more advantages, including but not limited to increasing user engagement with a social networking stream and/or social networking service generally.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent that the subject technology is not limited to the specific details set forth herein and may be practiced without these specific details.

Figure 1:
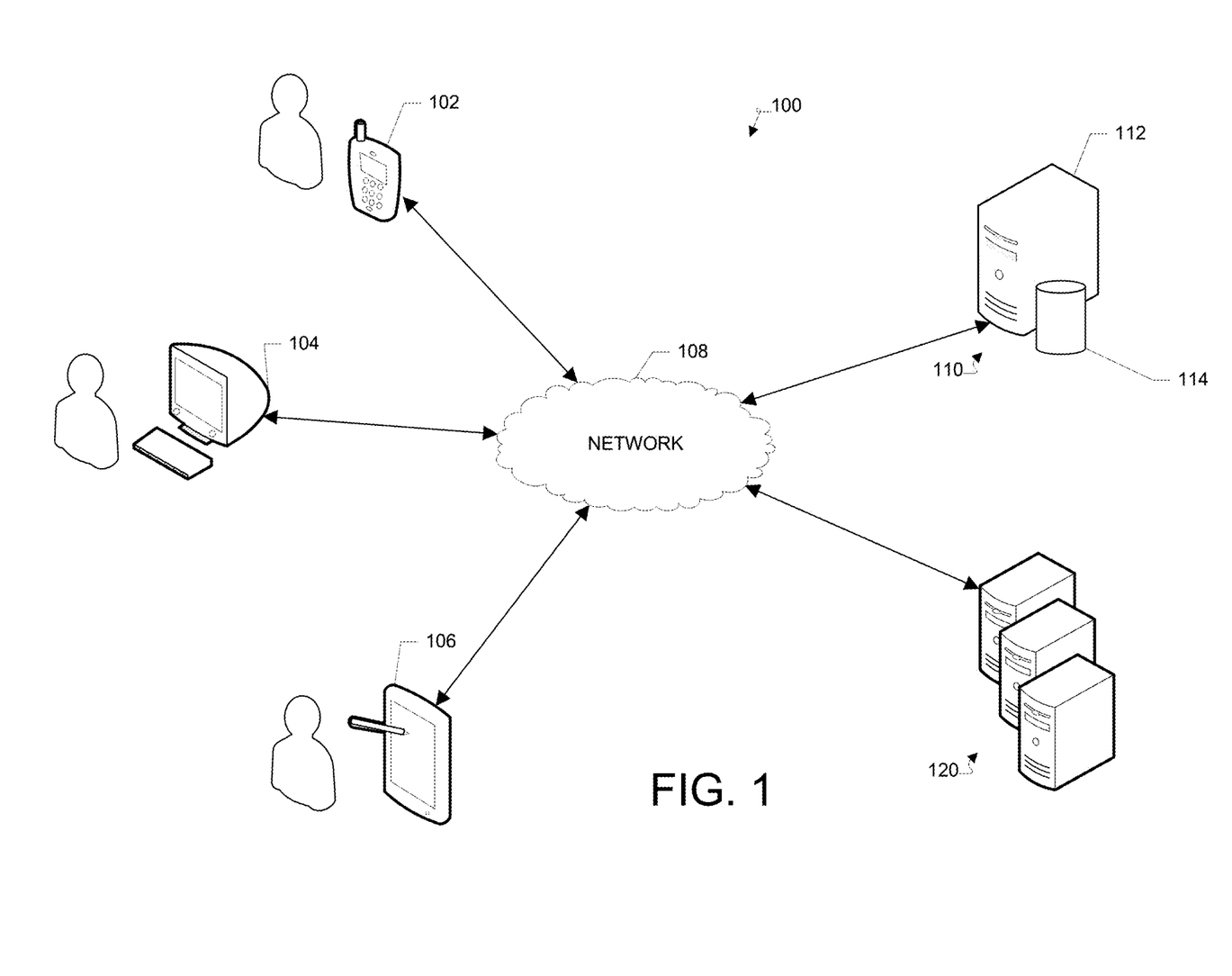
FIG. 1 illustrates an example client-server network environment, which provides for generating a second set of posts for display to user to encourage extended engagement with a social networking service.

Users of social networking services may create associations with one another. The phrase "social networking service" as used herein encompasses its plain and ordinary meaning, including, but not limited to, an online service, platform or site that focuses on building and reflecting of social associations among users. These associations may be stored within a social graph at each social networking service (e.g., maintained at remote server(s) 120). Such user associations may be defined on a user-to-user basis, or as a group of users associated through membership within a group. As used herein, "contacts" refer to other users that a user is associated with, at one or more social networking services. As used herein, a "post" generally refers to an item or document shared by one user ("post owner") with one or more other users of the social networking service. A post may include original content as well as preexisting content shared by the post owner. The post content may include text, images, video, audio, links, files, and/or other media.

A user may create "social groups" (e.g., social circles) including one or more contacts to organize his/her associations. The social groups may be additionally used to control distribution of messages and content to contacts of the user. For example, "social circles" are categories to which a user can assign their social networking contacts and better control the distribution and visibility of social networking messages as well as other multimedia content (e.g., documents, and other collaboration objects). In accordance with the subject disclosure, a social circle is provided as a data set defining a collection of contacts that are associated with one another. As used herein, a social circle can be described from the perspective of an individual that is the center of a particular collection of socially interconnected people, or from the aggregate perspective of a collection of socially interconnected people. In some examples, a social circle can have narrowly defined boundaries, all of the members of the social circle may be familiar with one another, and permission may be required for a member to join a social circle. In accordance with the subject disclosure, a user of an electronic device may define a social circle, and the social circle, as a data set defining a collection of contacts, may reflect a real-life social circle of the user.

For example, a user of an electronic device may have different groups of friends, coworkers, and family, and there may be some overlap among those groups (e.g., a coworker who is also considered to be a friend, a family member who is also a coworker). Through the creation and use of social groups (e.g., social circles), the user can organize and categorize his/her contacts into various different groupings.

Social networking services provide users with a set of posts for viewing as part of the user's social networking experience. The posts may include posts generated by other users, and shared with the user. Such posts may include private posts as well as public posts owned by contacts of the user and shared with the user.

When users begin a session at a social networking service or otherwise requests to view a set of content at a social networking service (e.g., within a user stream or feed), a set of content items ("posts") is selected and provided for display to the user. The set of posts may include various content posted to the social networking service (or other associated social networking services and/or other services) and being shared with or visible to the user. In some examples, upon receiving an indication of a user request to view a set of posts, for example, within his/her social stream (e.g., when a user logs onto a social networking service, clicks on his/her profile page, or otherwise takes an action that causes the social networking system to recognize that a social stream should be displayed to the user), a set of one or more posts is selected and provided to the user. In various implementations, the set of posts may be generated according to a push method or a pull query-based method.

The posts may be selected according to information regarding the user and/or characteristics of the posts. User information may include the user's friends and/or the users/entities that the user is following, end user credentials of the user for accessing posts, user preferences (e.g., topics of interest to the user), user settings, and/or other similar information that may be helpful in selecting posts for display to the user. Posts information may include posts content, post author/owner, post time (e.g., indicated by a time stamp), post activity (e.g., user activity with respect to and/or in result of the post), or other similar characteristics.

In one example, the system identifies posts authored/owned by contacts of the user (e.g., according to social graph information) as well as entities the user is following (e.g., according to social graph information). In some instances, posts visible to the user are retrieved. For example, for each retrieved post, the system determines if the post is visible to the user (i.e., based on end user credentials of the user and/or the posts being public). In one example, the system determines if the end user credentials of the user provide the user with access to the post and/or if the post is public.

The system may sort the retrieved posts (e.g., one or more posts of all posts and/or posts visible to the user) according to several quality criteria including the popularity of each post, the affinity of the user to the author of each post and the freshness of each post. In one instance, the system calculates a quality score for each post based on the quality criteria, and the posts are sorted according to the quality score for each post.

Freshness refers to the difference between the time the post was generated, updated and/or available for viewing (e.g., by the user or one or more other users) and the current time (e.g., at the time of the query).

In one example, the affinity information may provide an indication of the degree of closeness between the user and a post author/owner (e.g., a contact of the user). The affinity score may be determined based on activity between the user and the post author/owner at the social networking service and/or activity between the user and the post author/owner at one or more other services (e.g., email, chat, document sharing services, etc.). The affinity score may be based on historical activity between the user and the post author/owner at the social networking service and/or one or more outside services. In one example, the affinity information may include two scores, with a first score indicating the user/contact affinity at the social networking service and a second score indicating the user/contact affinity outside the social networking service. The affinity information may be a single aggregate score of both affinity at the social networking service and affinity at outside services.

In addition to considering the affinity between the user and the post owner, the affinity element of the quality score of a post may be further based on the affinity of the user with other users (e.g., contacts) which have performed an action with respect to the post (e.g., viewed the post, commented on the post, shared the post, endorsed the post).

Popularity of a post provides an indication of the amount of activity performed by one or more users of the social networking service with respect to the post. Actions may include views, comments, shares, endorsements (e.g., like, +1), and other similar actions taken toward a post. In one example, popularity of a post is determined in relation to time. That is, in one example, the popularity of a post is determined based on the number of actions that have been performed with respect to the post in relation to how long the post has been available, thus allowing for comparison of newer posts against older posts. In one example, the system may predict the popularity of a post over a period of time (e.g., based on the number of actions performed with respect to the post over the time the post has been available for viewing).

In addition to affinity, popularity and freshness, other criteria may also be taken into account for determining a quality score with respect to the post. In one example, each of the criteria used to determine the quality score may be weighted. For example, in some implementations, the freshness of posts provided to the users of a social networking service may be preferred as social networking has a temporal nature and users are most likely to be interested in the newest posts. Accordingly, freshness may be weighted more heavily when scoring the posts.

After the retrieved posts have been sorted, one or more posts are selected and provided for display to the user (e.g., within the user social stream), according to the ranking. The posts selected may, for example, be selected for display if they satisfy a first quality threshold. For example, posts having a quality score that is above a first quality threshold are provided to the user. In some examples, all posts having certain freshness may be provided for display to the user (e.g., the most current posts). In some examples, the selected posts may be displayed in order of freshness. In another example, the selected posts may be displayed in a sorted manner according to their quality criteria. In one example, the first set of posts is provided for display as a primary set of posts.

After the user is provided with the first set of posts (e.g., within a social stream), the system may at some point during user engagement with the posts determine that the user interest in the posts and/or the social stream has declined (e.g., below a predetermined threshold). In some examples, the decline in interest may result in the user ending their session at the social networking service. Thus, upon detecting that the user interest in the posts and/or social stream has declined, a new set of posts of the plurality of posts available for display to the user may be selected to be displayed within the user social stream to increase the user interest or engagement with the social networking service, thus prolonging user engagement with the social networking service.

Determining user level of interest and/or engagement with respect to the posts displayed within a social stream may be performed according to various indications of the user interaction with the posts (e.g., within the user social stream). In one example, the indications may include explicit user activity and/or heuristics that provide an insight regarding the user's interaction with the posts and/or user social stream. Example indications may include activity such as the user refreshing the page, for example, within a short range of time (e.g., which may include user desire to see more posts), scrolling (e.g., past posts the user has previously seen), or other indications that the user desires to see more/additional posts. In another example, the user may be provided with a mechanism for explicitly requesting additional posts.

In response to determining a decreased level of user interest, for example, in response to user activity indicating desire to see additional posts, a second set of posts may be identified. The second set of posts may be provided for display to the user as a secondary set of posts, according to some implementations. In one example, the second set of posts includes posts that were not previously served to the user and/or not viewed by the user. Posts that were not previously served to the user may, for example, include posts that did not satisfy a first quality threshold for selection and/or inclusion within the first set of posts provided for display to the user. A post may be determined to be not previously viewed by the user if the post was provided for display to the user, but it is determined according to indication of user activity (e.g., with respect to the post or posts being displayed to the user). A determination of whether a post was viewed by the user may be made with respect to served posts according to one or more indications. Such indication may for example include whether the post was brought into the viewport (e.g., if the user scrolled to the post), whether the post remained in the viewport for a specific period of time (e.g., if the post was in the viewport for enough time such that the user is likely to have seen the post), the position of the post within the viewport, position of user cursor with respect to the post, user activity with respect to the post, and/or other indicators of the posts being seen by the user.

In some examples, posts that were not previously served and/or viewed by the user are identified and a second set of posts is selected for display to the user. In one example, the selection of the second set of posts is similar to the selection process described above with respect to the first set of posts. For example, the posts are scored and ranked to select a second set of one or more posts to provide for display to the user. The ranking of the posts may be performed using similar criteria as those described above. In one example, a quality score may be determined for each post using one or more of the popularity, affinity and/or freshness criteria described above, as well as, other similar criteria. In some examples, the weight given to each factor within the score may be similar to the weight given to the factor for creating the first set of posts. In another example, a different set of weights may be assigned to each factor (e.g., popularity and/or affinity may have a higher weight than freshness). Once the posts are scored, one or more posts are selected for being presented as a second set, for example, within the user social stream. In one example, posts meeting a quality threshold may be selected for presentation. In some examples, the quality threshold for the second set of posts may be different from the quality threshold used for selecting the first set of posts (e.g., lower quality threshold to allow for posts that were not previously selected and/or served to be selected). In some examples, a different set of selection criteria may be used for selecting the second set of posts (e.g., based on user preferences and/or settings).

The second set of one or more posts may be provided for display to the user. Since the second set of posts includes posts not previously seen by the user, and is selected based on meeting some quality and/or selection criteria, the additional posts are likely to increase and/or prolong the user engagement with the social networking service. In one example, the second set of posts may be displayed on top of the first set of posts. The second set of posts may be ranked according to the quality score and/or according to one of the criteria, such as freshness. In another example, the second set of posts may be integrated into the first set of posts and ranked according to a uniform set of criteria with the first set of posts. In some examples, the posts within the second set of posts may include an indicator that notifies the user that the post is selected during a selection of a second set of posts. This is beneficial as users are likely to be confused when older posts are shown in a higher position. By creating a visual indication of posts belonging to the second set, the user is notified of the reason for the posts appearing along with newer posts.

FIG. 1 illustrates an example client-server network environment, which provides for generating a second set of posts for display to user to encourage extended engagement with a social networking service. A network environment 100 includes a number of electronic devices 102, 104, 106 communicably connected to a server 110 and remote servers 120 by a network 108. Network 108 can be a public communication network (e.g., the Internet, cellular data network, dialup modems over a telephone network) or a private communications network (e.g., private LAN, leased lines). Further, network 108 can include, but is not limited to, any one or more of the following network topologies, including a bus network, a star network, a ring network, a mesh network, a star-bus network, a tree or hierarchical network, and the like.

In some example implementations, electronic devices 102, 104, 106 can be computing devices such as laptop or desktop computers, smartphones, PDAs, portable media players, tablet computers, or other appropriate computing devices. In the example of FIG. 1, electronic device 102 is depicted as a smartphone, electronic device 104 is depicted as a desktop computer and electronic device 106 is depicted as a PDA.

In some implementations, server 110 includes a processing device 112 and a data store 114. Processing device 112 executes computer instructions stored in data store 114, for example, to facilitate generating a second set of posts for display to a user interacting with electronic devices 102, 104, 106 to encourage extended engagement. Server 110 may further be in communication with remote servers 120 either through the network 108 or through another network or communication means.

According to some aspects, remote servers 120 can be any system or device having a processor, a memory and communications capability for hosting various social networking services. Server 110 and one or more remote servers 120 may be further capable of maintaining social graphs of users and their contacts. The social networking service hosted on the server 110 or one or more remote servers 120 may enable users to create a profile and associate themselves with other users at a remote social networking service. The server 110 and/or remote servers 120 may further facilitate the generation and maintenance of a social graph including the user created associations. The social graphs may include, for example, a list of all users of the social networking service (s) and their associations with other users of the social networking service(s).

In some example aspects, server 110 and/or one or more remote servers 120 can be a single computing device such as a computer server. In other implementations, server 110 and/or one or more remote servers 120 can represent more than one computing device working together to perform the actions of a server computer (e.g., cloud computing). Server 110 and/or one or more remote servers 120 may be coupled with various remote databases or storage services. While server 110 and the one or more remote servers 120 are displayed as being remote from one another, it should be understood that the functions performed by these servers may be performed within a single server, or across multiple servers.

Communications between the client devices 102, 104, 106, server 110 and/or one or more remote servers 120 may be facilitated through various communication protocols. In some aspects, client devices 102, 104, 106, server 110 and/or one or more remote servers 120 may communicate wirelessly through a communication interface (not shown), which may include digital signal processing circuitry where necessary. The communication interface may provide for communications under various modes or protocols, including Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, including using a Bluetooth, WiFi, or other such transceiver.

Users may interact with the system hosted by server 110, and/or one or more services hosted by remote servers 120, through a client application installed at the electronic devices 102, 104, and 106. Alternatively, the user may interact with the system and/or services through a web based browser application at the electronic devices 102, 104, 106. Communication between client devices 102, 104, 106 and the system, and/or one or more social networking services, may be facilitated through a network (e.g., network 108).

The network 108 can include, for example, any one or more of a personal area network (PAN), a local area network (LAN), a campus area network (CAN), a metropolitan area network (MAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

Figure 2:
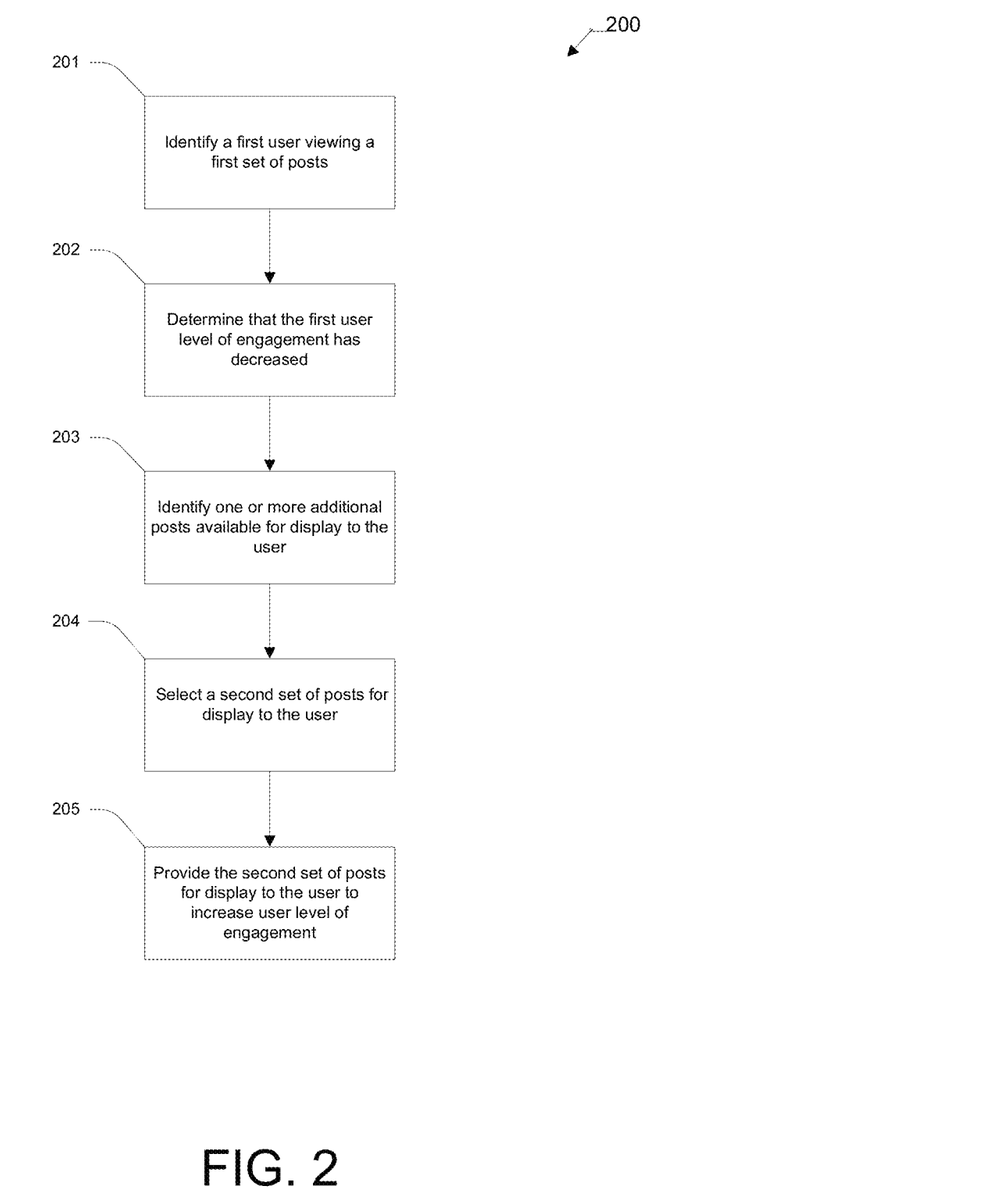
FIG. 2 illustrates a flow diagram of an example process for generating a second set of posts for display to a user to encourage extended engagement.

FIG. 2 illustrates a flow diagram of an example process 200 for generating a second set of posts for display to a user to encourage extended engagement. In step 201, a first user viewing a first set of posts is identified. The first set of posts may include one or more posts provided for display to the user. The first set of posts may be selected from the plurality of posts available for being displayed to the user according to one or more selection criteria. The selection criteria, as described above, may include quality criteria such as popularity, affinity and/or freshness. As described above, the posts may be ranked according to the quality criteria and one or more posts may be selected for display to the user in the first set of posts. In one example, the selection is based on a first quality threshold.

In step 202, it is determined that the user level of engagement has decreased. In one example, the determination is made according to receiving indication of user activity with respect to the set of posts. In some examples, the user activity over a period of time may provide an indication of when the user engagement with respect to content falls below an expected level of engagement. For example, past behavior of the user indicating that the user is likely to terminate engagement with a session or with the posts may provide an indication of the user engagement decreasing. In another example, certain user activity with respect to the first set of posts may signal a decreased level of engagement. Example indications may include activity such as the user refreshing the page, for example, within a short range of time (e.g., which may include user desire to see more posts), scrolling (e.g., past posts the user has previously seen), or other indications that the user desires to see more/additional posts. In another example, the user may be provided with a mechanism for explicitly requesting additional posts.

In step 203, one or more additional posts available for display to the user are identified. In one example, the one or more additional posts include posts that were not previously served to the user and/or not previously viewed by the user. Posts that were not previously served to the user may, for example, include posts that did not satisfy a first quality threshold for selection in the first set of posts and/or in previous sessions. In one example, a post is determined to not be viewed by the user, if the post was provided for display to the user, but indication of the post being viewed was not received. For example, posts may be served in a lower rank to the user, and thus, while the post was served to the user, the user may not have viewed the posts in a previous session. A determination of whether a post was viewed by the user may be made with respect to served posts according to one or more indications. Such indication may for example include whether the post was brought into the viewport (e.g., if the user scrolled to the post), whether the post remained in the viewport for a specific period of time (e.g., if the post was in the viewport for enough time such that the user previously saw the post), the position of the post within the viewport, position of user cursor with respect to the post, user activity with respect to the post, and/or other indicators of whether the user is likely to have seen the post.

In step 204, a second set of posts are selected from the one or more posts identified in step 203. In some examples, the one or more other posts available for display to the user are scored to select a second set of one or more posts. In one example, a quality score may be determined for each of the posts identified using one or more of the popularity, affinity and/or freshness criteria described above, as well as, other similar criteria. In some examples, the weight given to each factor within the score may be similar to the weight given to the factor for creating the first set of posts. In another example, a different set of weights may be assigned to each factor (e.g., popularity and/or affinity may have a higher weight than freshness). Once the posts are scored, one or more posts may be selected for being presented as a second set. In one example, posts meeting a quality threshold may be selected for presentation. In some examples, the quality threshold for the second set of posts may be different from the quality threshold used for selecting the first set of posts (e.g., lower quality threshold to allow for posts that were not previously selected and/or served to be selected). In some examples, a different set of selection criteria may be used for selecting the second set of posts (e.g., based on user preferences and/or settings).

Figure 4:
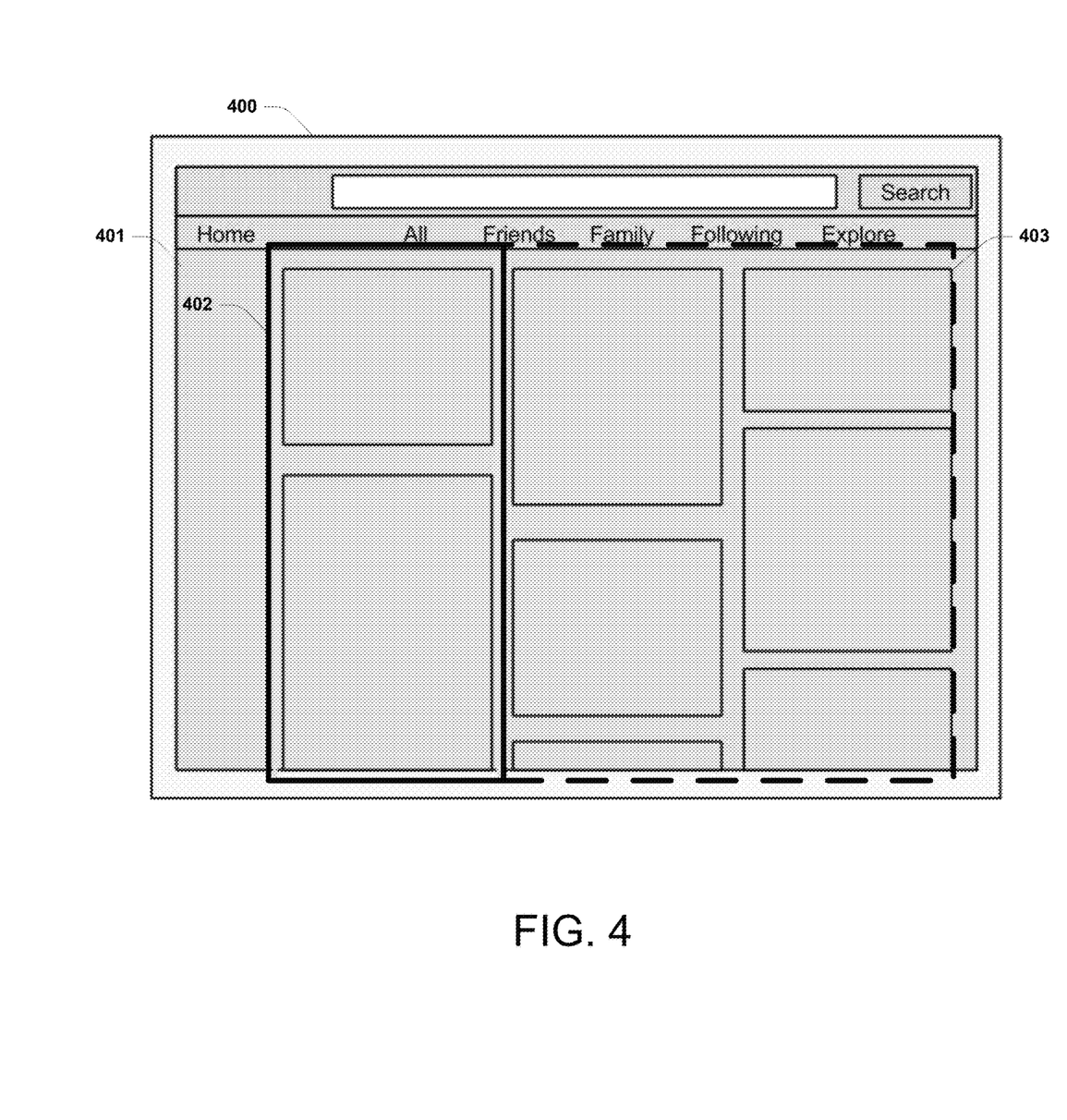
FIG. 4 illustrates an example graphical user interface displaying an alternative layout for a set of posts including a second set of posts to increase user engagement.
Figure 5:
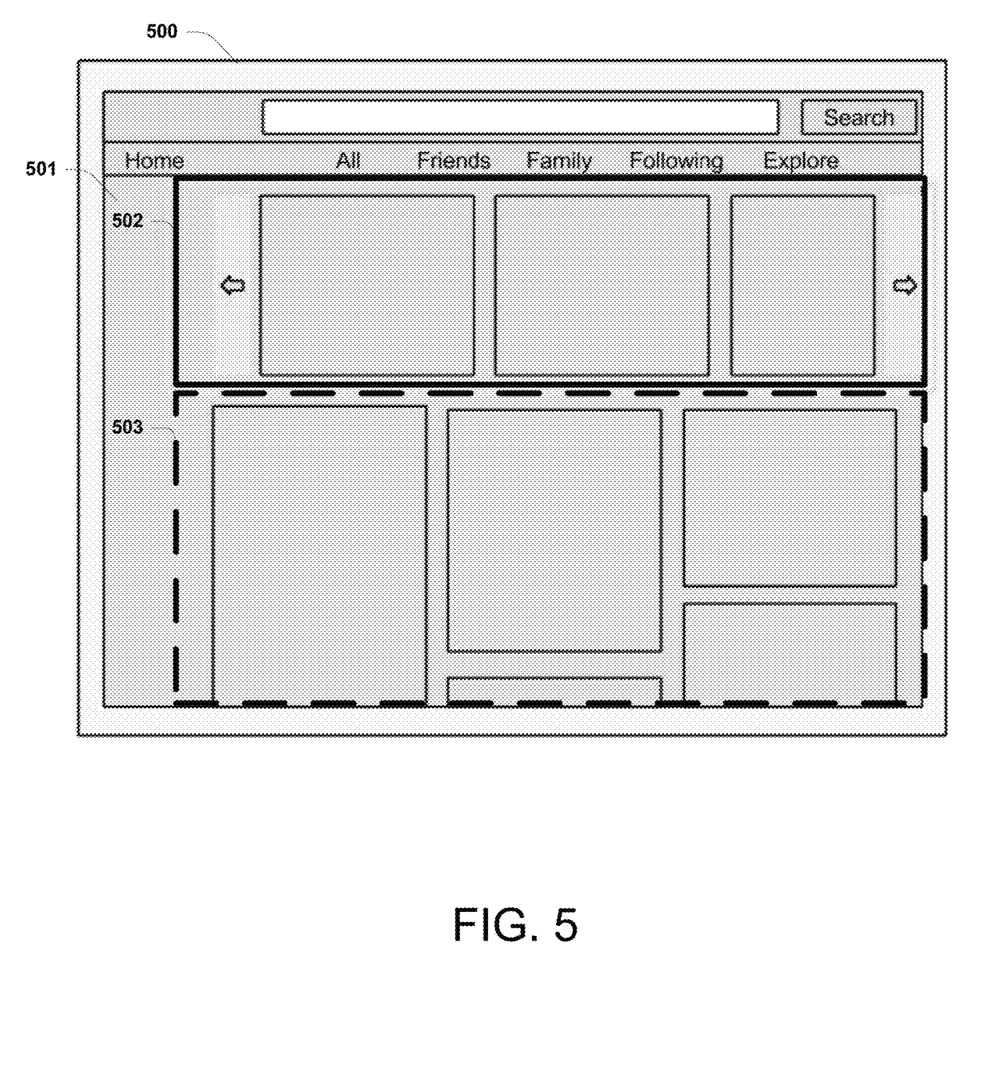
FIG. 5 illustrates an example graphical user interface displaying a displaying another alternative layout for a set of posts including a second set of posts to increase user engagement.
Figure 6:
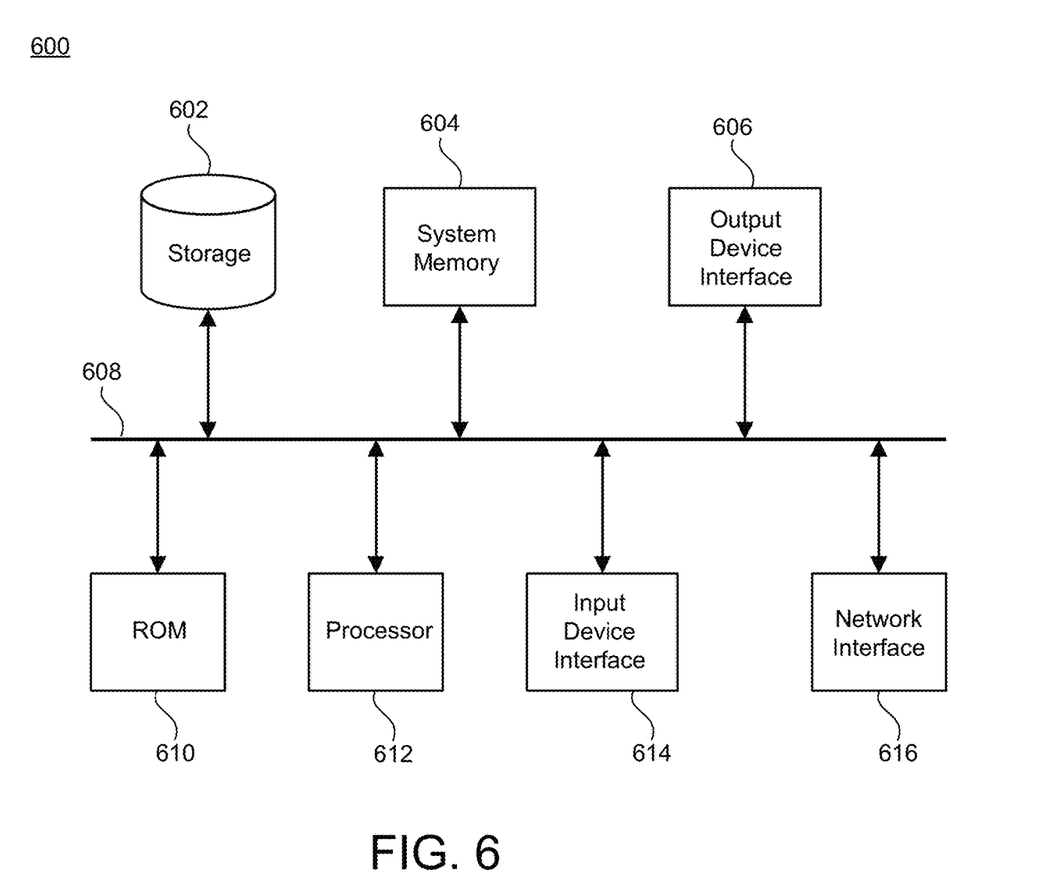
FIG. 6 conceptually illustrates an electronic system with which some implementations of the subject technology are implemented.

In step 205, the second set of posts is provided for display to the user to increase the user level of engagement. Since the second set of posts includes posts not previously seen by the user, and is selected based on meeting some quality and/or selection criteria, the additional posts may increase and/or prolong the user engagement with the social networking service. In one example, the second set of posts may be displayed on top of the first set of posts. For example, the two sets may be concatenated with the second set of posts being displayed on top of the first set of posts. In another example, the second set may be shown in a special area of the user interface displaying posts. The second set of posts may be displayed in order, for example, according to the quality score and/or according to one of the criteria, such as freshness. In another example, the second set of posts may be integrated into the first set of posts and display in order, for example, ranked according to a uniform set of criteria with the first set of posts. In some examples, the posts within the second set of posts may include an indicator that notifies the user that the post is selected during a selection of a second set of posts. This is beneficial as users are likely to be confused when older posts are shown in a higher position. By creating a visual indication of posts belonging to the second set, the user is notified of the reason for the second posts appearing on top of newer posts. FIGS. 4, 5 and 6 described in more detail below, provide various examples of an exemplary user interface displaying a first and/or second set of posts for display to a user.

Figure 3:
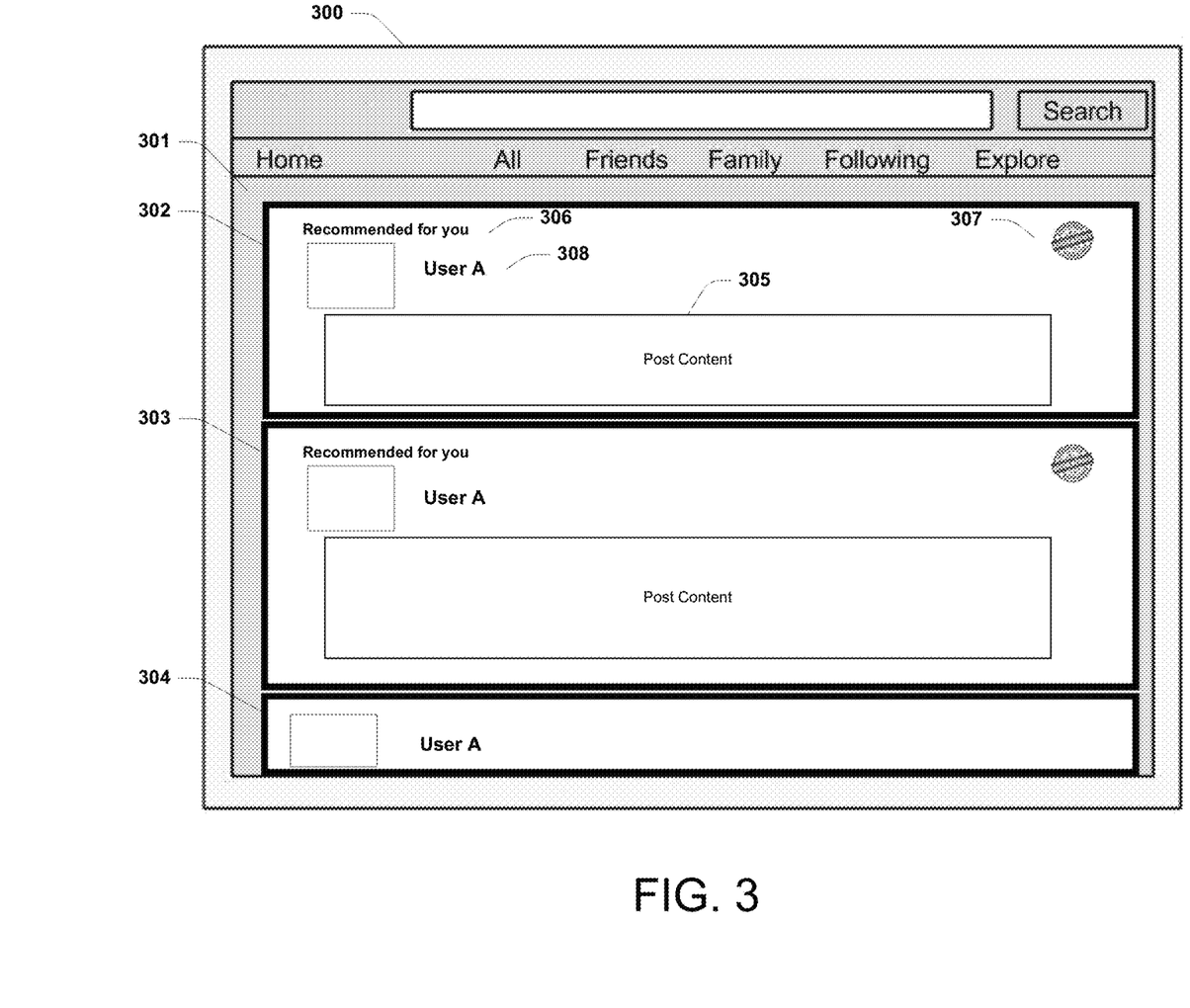
FIG. 3 illustrates an example graphical user interface displaying a set of posts to the user, including a second set of posts for increasing user engagement with the posts.

FIG. 3 illustrates an example graphical user interface 300 displaying a set of posts to the user, including a second set of posts for increasing user engagement with the posts. As illustrated in FIG. 3, a post area (e.g., social stream) 301 displaying posts 302, 303 and 304 viewable by the user. In one example, posts 302 and 303 belong to a second set of posts, as described above, provided to the user to increase user engagement. As shown in the exemplary user interface 300, each post 302, 303 and 304 may include identifying information 308 of the user that created or generated the post and post content 305. Other information including time of generation, and user activity with respect to the post may also be displayed (not shown). Posts 302 and 303 further include visual indicia 306 and 307 that the posts are "recommended" posts provided in addition to the regular set of posts to increase user engagement. The indicia may for example include displaying a "recommended for you" message 306 and recommended label 307 within each post as shown in user interface 300. In the example user interface 300, the recommended posts 302 and 303 are displayed on top of the regular posts including post 304. In other examples, the recommended posts may be displayed in a different layout within the user interface.

FIG. 4 illustrates an example graphical user interface 400 displaying an alternative layout for a set of posts including a second set of posts to increase user engagement. As shown, user interface 400 includes a post area 401, displaying a first set of posts 402 (e.g., second set of posts) and a second set of posts 403 (e.g., first set of posts). FIG. 5 illustrates an example graphical user interface 500 displaying a displaying another alternative layout for a set of posts including a second set of posts to increase user engagement. As shown, user interface 500 includes a post area 501, displaying a first set of posts within a top area 502 (e.g., second set of posts) and a second set of posts displayed within a second area 503 (e.g., first set of posts).

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

FIG. 6 conceptually illustrates an electronic system with which some implementations of the subject technology are implemented. Electronic system 600 can be a server, computer, phone, PDA, laptop, tablet computer, television with one or more processors embedded therein or coupled thereto, or any other sort of electronic device. Such an electronic system includes various types of computer readable media and interfaces for various other types of computer readable media. Electronic system 600 includes a bus 608, processing unit(s) 612, a system memory 604, a read-only memory (ROM) 610, a permanent storage device 602, an input device interface 614, an output device interface 606, and a network interface 616.

Bus 608 collectively represents all system, peripheral, and chipset buses that communicatively connect the numerous internal devices of electronic system 600. For instance, bus 608 communicatively connects processing unit(s) 612 with ROM 610, system memory 604, and permanent storage device 602.

From these various memory units, processing unit(s) 612 retrieves instructions to execute and data to process in order to execute the processes of the subject disclosure. The processing unit(s) can be a single processor or a multi-core processor in different implementations.

ROM 610 stores static data and instructions that are needed by processing unit(s) 612 and other modules of the electronic system. Permanent storage device 602, on the other hand, is a read-and-write memory device. This device is a non-volatile memory unit that stores instructions and data even when electronic system 600 is off. Some implementations of the subject disclosure use a mass-storage device (such as a magnetic or optical disk and its corresponding disk drive) as permanent storage device 602.

Other implementations use a removable storage device (such as a floppy disk, flash drive, and its corresponding disk drive) as permanent storage device 602. Like permanent storage device 602, system memory 604 is a read-and-write memory device. However, unlike storage device 602, system memory 604 is a volatile read-and-write memory, such a random access memory. System memory 604 stores some of the instructions and data that the processor needs at runtime. In some implementations, the processes of the subject disclosure are stored in system memory 604, permanent storage device 602, and/or ROM 610. For example, the various memory units include instructions for generating a multiple sets of posts for display to a user to encourage extended engagement according to various implementations. From these various memory units, processing unit(s) 612 retrieves instructions to execute and data to process in order to execute the processes of some implementations.

Bus 608 also connects to input and output device interfaces 614 and 606. Input device interface 614 enables the user to communicate information and select commands to the electronic system. Input devices used with input device interface 614 include, for example, alphanumeric keyboards and pointing devices (also called "cursor control devices"). Output device interfaces 606 enables, for example, the display of images generated by the electronic system 600. Output devices used with output device interface 606 include, for example, printers and display devices, such as cathode ray tubes (CRT) or liquid crystal displays (LCD). Some implementations include devices such as a touchscreen that functions as both input and output devices.

Finally, as shown in FIG. 6, bus 608 also couples electronic system 600 to a network (not shown) through a network interface 616. In this manner, the computer can be a part of a network of computers (such as a local area network ("LAN"), a wide area network ("WAN"), or an Intranet, or a network of networks, such as the Internet. Any or all components of electronic system 600 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that some illustrated steps may not be performed. Some of the steps may be performed simultaneously. For example, in certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A machine-implemented method, comprising:
   identifying a first user viewing a first set of posts at a social networking service, the first set of posts including one or more posts of a plurality of posts available for display to the first user that meet a first selection criterion;
   determining that a level of engagement of the first user with respect to the first set of posts at the social networking service is below a predetermined level;
   generating a second set of posts in response to determining that the level of engagement of the first user at the social networking service is below a predetermined level, the second set of posts including one or more posts not previously seen by the first user; and
   providing the second set of posts for display to the first user,
   wherein generating the second set of posts comprises:
      identifying a plurality of posts not previously seen by the first user; and
      selecting the one or more posts of the second set of posts from the plurality of posts,
      wherein selecting the second set of posts comprises:
         determining a quality score for each of the one or more posts of the second posts; and
         determining that the quality score of each of the one or more posts meets a quality criterion.

2. The method of claim 1, further comprising:
   identifying a plurality of posts, the plurality of posts including posts available for being provided for display to the first user;
   selecting the first set of posts from the plurality of posts according to the first selection criterion; and
   providing the first set of posts for display to the first user.

3. The method of claim 2, wherein the selecting the first set comprises, determining that a quality indication of the first set of posts meets a first quality threshold.

4. The method of claim 1, wherein the one or more posts of the second set of posts are selected from other posts of the plurality of posts that do not meet the first selection criterion.

5. The method of claim 4, wherein the first selection criterion is different from the second selection criterion.

6. The method of claim 4, wherein the first selection criterion comprises a first quality threshold and the second selection criterion includes a second quality threshold and wherein the second quality threshold is lower than the first quality threshold.

7. The method of claim 1, wherein the quality score for each post is determined according to one or more of a popularity score, an affinity score or a freshness score associated with the post.

8. The method of claim 1, wherein a post is determined to be not previously seen by the first user if the post was not previously provided for display to the first user.

9. The method of claim 1, wherein a post is determined to be not previously seen by the first user if the post was previously provided for display to the first user but the post was not determined to be seen by the first user.

10. The method of claim 9, wherein determining if a post is previously seen by the first user is based on one or more indications of user activity with respect to the post provided for display to the first user.

11. The method of claim 10, wherein the one or more indications include whether the post was brought into a viewport, whether the post remained in the viewport for a specific period of time, a position of the post within the viewport, a position of a cursor with respect to the post, or user activity with respect to the post.

12. The method of claim 1, wherein determining that the level of engagement of the first user is below a predetermined level comprises:
   determining the level of engagement of the first user with respect to the first set of posts based on one or more engagement criteria; and
   determining that the determined level of engagement of the first user is below the predetermined level.

13. The method of claim 12, wherein the engagement criteria include historical activity of the first user with respect to posts displayed to the first user.

14. The method of claim 12, wherein the engagement criteria include one or more explicit actions by the first user that indicate user interest to see more posts, the one or more explicit actions including refreshing a page, scrolling or explicitly requesting additional posts.

15. A system comprising:
   one or more processors; and
   a machine-readable medium comprising instructions stored therein, which when executed by the processors, cause the processors to perform operations comprising:
      identifying a first user viewing a first set of posts at a social networking service, the first set of posts including one or more posts selected from a plurality of posts available for display to the first user that meet a first selection criterion;
      determining that a level of engagement of the first user with respect to the first set of posts is below a predetermined level based on one or more engagement criteria;

generating a second set of posts, the second set of posts including one or more posts of the plurality of posts not previously seen by the first user; and providing the second set of posts for display to the first user in response to determining that the level of engagement of the first user with respect to the first set of posts is below a predetermined level, wherein generating the second set of posts comprises:
identifying a plurality of posts not previously seen by the first user; and
selecting the one or more posts of the second set of posts from the plurality of posts,
wherein selecting the second set of posts comprises:
determining a quality score for each of the one or more posts of the second posts; and
determining that the quality score of each of the one or more posts meets a second selection criterion.

16. A machine-implemented method, comprising:
identifying a first user viewing a first set of posts at a social networking service, the first set of posts including one or more posts of a plurality of posts available for display to the first user that meet a first selection criterion;

determining that a level of engagement of the first user with respect to the first set of posts at the social networking service is below a predetermined level;

generating a second set of posts in response to determining that the level of engagement of the first user at the social networking service is below a predetermined level, the second set of posts including one or more posts not previously seen by the first user; and providing the second set of posts for display to the first user, wherein the one or more posts of the second set of posts are selected from other posts of the plurality of posts that do not meet the first selection criterion, wherein the one or more posts of the second set of posts meet a second selection criterion, and wherein the first selection criterion comprises a first quality threshold and the second selection criterion includes a second quality threshold and wherein the second quality threshold is lower than the first quality threshold.

17. A system comprising:
one or more processors; and
a machine-readable medium comprising instructions stored therein, which when executed by the processors, cause the processors to perform operations comprising:
identifying a first user viewing a first set of posts at a social networking service, the first set of posts including one or more posts selected from a plurality of posts available for display to the first user that meet a first selection criterion;

determining that a level of engagement of the first user with respect to the first set of posts is below a predetermined level based on one or more engagement criteria;

generating a second set of posts, the second set of posts including one or more posts of the plurality of posts not previously seen by the first user; and providing the second set of posts for display to the first user in response to determining that the level of engagement of the first user with respect to the first set of posts is below a predetermined level, wherein the one or more posts of the second set of posts are selected from other posts of the plurality of posts that do not meet the first selection criterion, wherein the one or more posts of the second set of posts meet a second selection criterion, and wherein the first selection criterion comprises a first quality threshold and the second selection criterion includes a second quality threshold and wherein the second quality threshold is lower than the first quality threshold.

* * * * *